United States Patent [19]

Pettersson

[11] Patent Number: 4,844,668
[45] Date of Patent: Jul. 4, 1989

[54] TURNING INSERT

[75] Inventor: Lars T. Pettersson, Gävle, Sweden

[73] Assignee: Sandvik AB, Sandviken, Sweden

[21] Appl. No.: 80,392

[22] Filed: Jul. 29, 1987

[30] Foreign Application Priority Data

Aug. 18, 1986 [SE] Sweden .............................. 8603465

[51] Int. Cl.⁴ ................................................ B26B 1/00
[52] U.S. Cl. .................................... 407/117; 407/116
[58] Field of Search ............... 407/120, 117, 116, 115, 407/114, 113, 105

[56] References Cited

U.S. PATENT DOCUMENTS

| | | | |
|---|---|---|---|
| 3,705,447 | 12/1972 | Kollar | 407/120 |
| 4,273,480 | 6/1981 | Shirai et al. | 407/114 |
| 4,588,333 | 5/1986 | Gustafson | 407/117 |

OTHER PUBLICATIONS

Brochure, "Secodex 150.15", by SEco Tools, AB, Sweden, (2 Pages—ST 814433 US).

Primary Examiner—Frederick R. Schmidt
Assistant Examiner—Blynn Shideler
Attorney, Agent, or Firm—Burns, Doane, Swecker & Mathis

[57] ABSTRACT

The invention relates to a turning insert. The insert (10) consists of longitudinally extending surfaces (13,14), end surfaces (15, 16), side surfaces (11), a shoulder (17) and a portion (18) provided with a cutting edge (19). The cutting edge (19) is circular and has a diameter which exceeds the thickness of the insert which makes a plurality of turning operations possible, including grooving into unlimited depth. The portion (18) is provided with rake face (25) sloping downwardly and inwardly from the cutting edge, which face is provided with a plurality of concave recesses (23) intersecting each other.

5 Claims, 2 Drawing Sheets

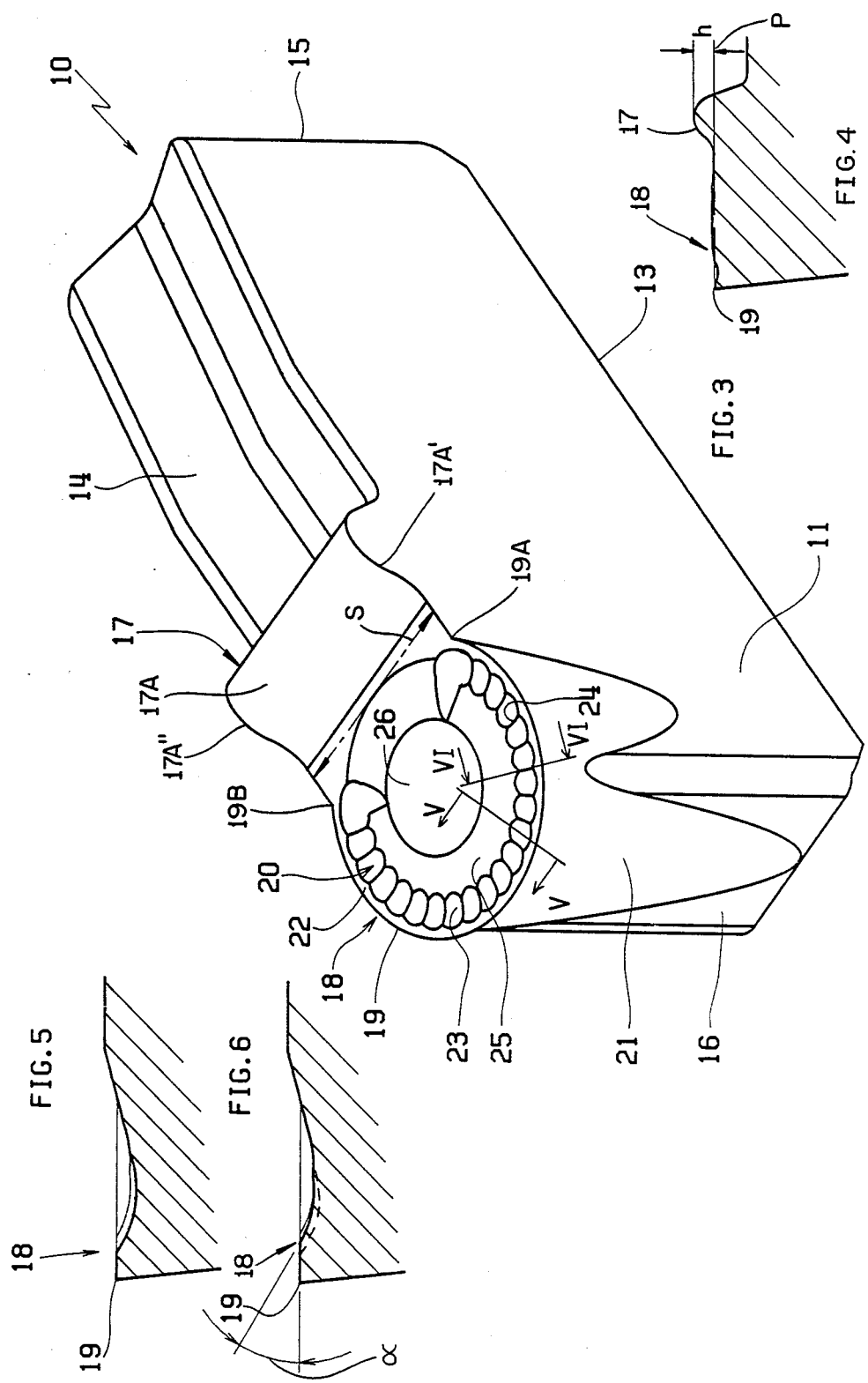

TURNING INSERT

BACKGROUND OF THE INVENTION

The present invention relates to a turning insert comprising a pair of longitudinally extending surfaces enclosing an acute angle and forming a wedge-shaped insert body, a forward end of said insert arranged at the wider portion of the insert body which carries a cutting edge, a rearward end arranged at the narrower portion of the insert body and a shoulder. The cutting edge has a circular shape and a diameter which exceeds the thickness of the insert. The insert has a chip breaking device radially inside the cutting edge which device has a mainly circular shape.

The U.S. Pat. No. 3,705,447 shows a turning insert which comprises a partly circular cutting edge which connects to straight cutting edges for outwards facing. The connection between the circular portion and the straight portions weakens the insert. Furthermore, the rake face of the insert does not have any chip forming means and therefore the insert achieves a negative geometry. Thus, this type of geometry transfers large forces from the work piece to the holder carrying the insert.

One object of the present invention is to shape an insert such that it can perform a plurality of turning operations.

Another object is to adapt the insert for good chip control, irrespective of feed direction.

Still another object is to provide an insert that cuts with a varying setting angle.

THE DRAWINGS

These and other objects have been achieved by shaping the insert as described hereinafter in connection with the appended drawings.

FIG. 3 shows a perspective view of the insert.

FIG. 4 shows a cross-section of the insert according to the line IV—IV in FIG. 1.

FIGS. 5 and 6 show cross-sections of the insert taken along lines V—V and VI—VI, respectively, in FIG. 3.

DESCRIPTION OF A PREFERRED EMBODIMENT OF THE INVENTION

Figure 1:
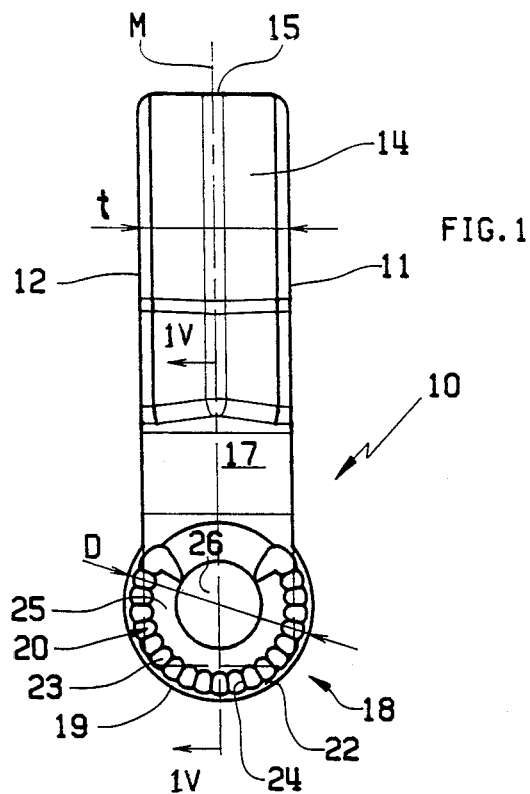
FIG. 1 shows a top view of an insert according to the invention.
Figure 2:
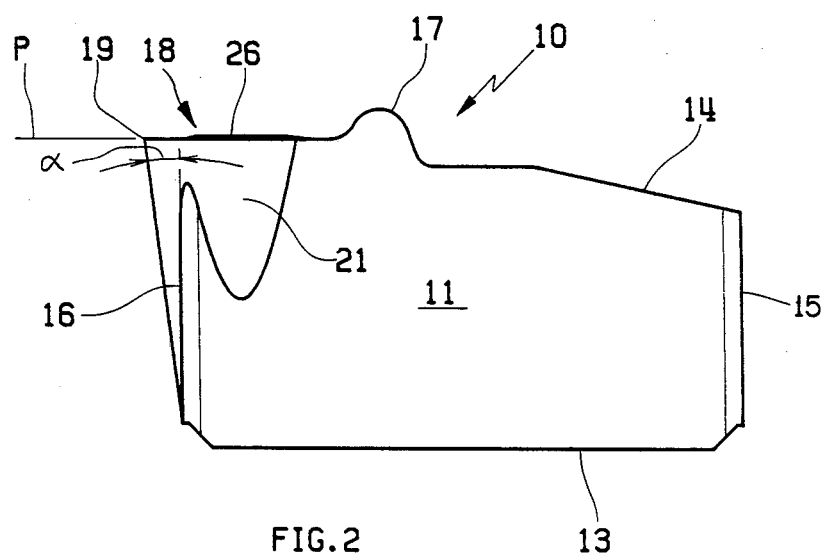
FIG. 2 shows a side view of the insert.

An insert 10 according to the invention is shown in the figures. It comprises two mainly plane-parallel side surfaces 11,12, two edge surfaces 13,14, two end surfaces 15,16, a shoulder 17 and a portion 18 provided with a cutting edge and a chip forming device 20. The insert 10 shall be secured to a holder body provided with an integral clamping arm. The insert is clamped in a working position by the resilient force with which the arm influences on the insert. The clamping of the insert is described in our Swedish patent application No. 8601533-6 corresponding to copending U.S. Application Ser. No. 35,015 filed July 6, 1987 which is hereby incorporated with the description. On edge surface 13 constitutes a first support surface for the insert against the holder body, which is parallel with the neutral plane P of the machine. The neutral plane is the plane defined by the axial feed direction of the machine and the radial feed direction of the machine. The other edge surface 14 constitutes a second support surface for the insert against the holder body. The edge surface 14 forms an acute angle with the edge surface 13 at the narrower portion of the insert. The edge surface 14 is broken in the vicinity of the middle of the insert whereafter it becomes mainly parallel with the edge surface 13. The edge surface 14 connects to a shoulder 17 whose crest defines the largest height h of the insert above the neutral plane P. The cutting edge 19 is circular and it has a diameter D which is 1 to 75%, preferably 10 to 40%, larger than the thickness t of the insert. The cutting edge describes therebetween a curve defined by an angle of at least 200°, preferably of at least 220°. The setting angle of the insert will then vary during outwards facing which will give the insert less vibrations. The cutting edge 19 is formed along the intersection line of a clearance face 21 and a list 22. The clearance face 21 is arranged outside the rectangular basic shape which, in top view, is formed by the side surfaces 11, 12 and the end surface 16, see the dotted lines in FIG. 1. The clearance face 21 forms an acute angle $\alpha$, about 0.1° to 15°, preferably 2° to 12°, with the end surface 16 (FIG. 2) or the side surface 11 to 12 in a section taken along the mid-line M of the insert and along a line perpendicular to the mid-line of the insert, respectively. The list 22 is mainly planarly shaped and it coincides with the neutral plane P. The list is bordered radially inwardly by an array of recess 23, which intersect one another along ridges 24, which extend prependicularly to the cutting edge 19. Each recess 23 has the shape of a toroid, alternatively it is spherically, elliptically or parabolically concave.

The recesses, which are about 20 in number, aim to give the insert a positive rank angle $\gamma$ about 5° to 30° and to plastically deform (corrugate) a chip such that it becomes easier to break. The ridges 24 support the list 22.

The recesses 23 are arranged on a rake face 25 which slopes downwardly and inwardly, towards the center of the radius of the cutting edge. The rake face 25 which is concave, has a bottom area arranged radially inside the radially innermost border lines of the recesses. The rake face then rises towards a planar central portion 26, which has been arranged above or coplanar with the cutting edge 19. The shoulder 17 has a forwardly facing, laterally extending chip forming face 17A which performs a chip forming function when the chips flow at small feed in the direction of the mid-line M.

The chip forming face 17A has a lateral extent no smaller than a lateral spacing S between the terminal ends 19A, 19B of the arcuate cutting edge. The chip forming face 17A includes laterally spaced outer ends 17A', 17A" situated no farther forwardly than the terminal ends 19A, 19B.

The chips flow during turning mainly perpendicularly to the cutting edge 19 and therefore the chip forming device 20 is identical all along the cutting edge. At small feed the chips will flow over the recesses and will be formed at the shoulder 17. At large feed the chips will follow along most of the rake face and the recess and will then break against the work piece.

Thus, the invention relates to a turning insert through which shape a plurality of turning operations can be realized including parting and grooving into unlimited depth. The insert has a chip forming device which minimizes transfer of the cutting forces from the work piece.

I claim:

1. A turning tool for parting and grooving comprising parallel planar side surfaces, upper and lower longitudinal surfaces, and front and rear end surfaces, said side surfaces being laterally spaced apart and interconnecting said upper and lower surfaces and interconnecting said front and rear surfaces, said front end surface including a clearance face which intersects a front end of said upper longitudinal surface to define an arcuate cutting edge comprising a circular segment extending at least 200 degrees, said circular segment including rear terminal edges which are laterally spaced apart by a distance which is less than a diameter of said cutting edge, portions of said side surfaces disposed rearwardly of said terminal ends being laterally spaced apart by a distance which is less than said diameter, said upper surface including a rake face extending radially inwardly of said cutting edge, and a shoulder upstanding from said upper surface to a height beyond an imaginary plane containing said cutting edge, said shoulder including a forwardly facing, laterally extending chip forming face having a lateral dimension no shorter than the lateral spacing between said terminal ends of said circular segment, said chip forming face including lateral outer ends situated no farther forwardly than said terminal ends of said circular segment.

2. An insert according to claim 1, wherein said imaginary plane is parallel to said lower surface.

3. An insert according to claim 1, wherein said arcuate cutting edge extends at least 220 degrees.

4. An insert according to claim 3, wherein said diameter is from 10 to 40 percent larger than said lateral spacing of said portions of said side surfaces.

5. An insert according to claim 1, wherein said clearance face forms a clearance angle of from 2 to 12 degrees.

* * * * *